(12) United States Patent
Gebraad

(10) Patent No.: US 11,536,249 B2
(45) Date of Patent: Dec. 27, 2022

(54) DETERMINING CONTROL SETTINGS FOR A WIND TURBINE

(71) Applicant: Siemens Gamesa Renewable Energy A/S, Brande (DK)

(72) Inventor: Pieter M. O. Gebraad, København (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/976,522

(22) PCT Filed: Mar. 1, 2019

(86) PCT No.: PCT/EP2019/055120
§ 371 (c)(1),
(2) Date: Aug. 28, 2020

(87) PCT Pub. No.: WO2019/170537
PCT Pub. Date: Sep. 12, 2019

(65) Prior Publication Data
US 2021/0047999 A1 Feb. 18, 2021

(30) Foreign Application Priority Data
Mar. 8, 2018 (EP) .................................... 18160750

(51) Int. Cl.
*F04D 7/04* (2006.01)
*F03D 7/04* (2006.01)
*F03D 7/02* (2006.01)

(52) U.S. Cl.
CPC ........... *F03D 7/048* (2013.01); *F03D 7/0204* (2013.01); *F03D 7/0224* (2013.01); *F05B 2260/70* (2013.01)

(58) Field of Classification Search
CPC ... F03D 7/048; F03D 7/0204; F05B 2270/204
See application file for complete search history.

(56) References Cited

U.S. PATENT DOCUMENTS

| | | | |
|---|---|---|---|
| 9,617,975 B2* | 4/2017 | Attia | F03D 7/0204 |
| 2011/0193344 A1 | 8/2011 | Lafferty et al. | |
| 2020/0166016 A1* | 5/2020 | Cortiana | F03D 17/00 |

FOREIGN PATENT DOCUMENTS

| | | |
|---|---|---|
| EP | 1534951 B1 | 6/2011 |
| EP | 2940296 A1 | 11/2015 |

(Continued)

OTHER PUBLICATIONS

P. M. O. Gebraad, F. W. Teeuwisse, J. W. van Wingerden, P. A. Fleming, S. D. Ruben, J. R. Marden, and L. Y. Pao: "A data-driven model for wind plant power optimization by yaw control" 2014 American Control Conference (ACC) Jun. 4-6, 2014. Portland, Oregon, USA.

(Continued)

*Primary Examiner* — Justin D Seabe
(74) *Attorney, Agent, or Firm* — Schmeiser, Olsen & Watts LLP

(57) ABSTRACT

Provided is a method of determining a control setting of at least one wind turbine of a wind park, the method including: determining a free-stream wind turbulence and deriving the control setting based on the free-stream wind turbulence, wherein the control setting includes a yawing offset, and wherein the yawing offset is derived to be the smaller, the higher the free-stream wind turbulence is.

17 Claims, 2 Drawing Sheets

(56) References Cited

FOREIGN PATENT DOCUMENTS

Figure 1:
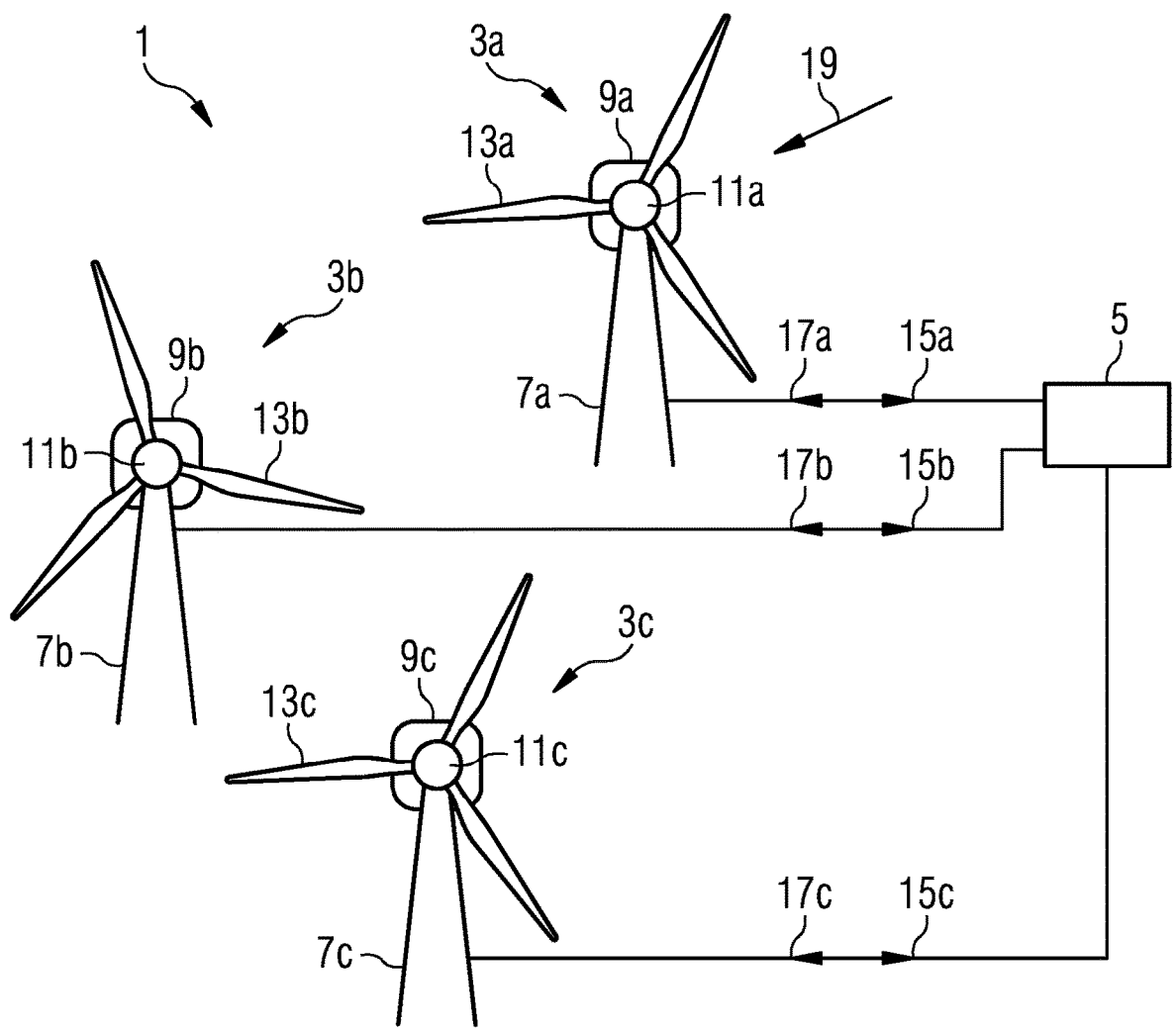

| EP | 3121442 A1 | 1/2017 |
|---|---|---|
| EP | 2788620 B1 | 10/2017 |
| EP | 3263889 A1 | 1/2018 |

OTHER PUBLICATIONS

Gebraad P.M.O. et al: "Wind turbine wake estimation and control using FLORIDyn, a control-oriented dynamic wind plant model", 2015 American Control Conference (ACC), pp. 1702-1708, XP055413503, DOI: 10.1109/ACC.2015.7170978, ISBN: 978-1-4799-8684-2, the whole document; 2015.

Paul Fleming et al. "Field test of wake steering at an offshore wind farm" Wind Energ. Sci., 2, 22+ 239, 2017. doi:10.5194/wes-2-229-2017.

P. Gebraad, J.J. Thomas, A. Ning, P. Fleming, and K Dykes: "Maximization of the annual energy production of wind power plants by optimization of layout and yaw-based wake control" Wind Energy, May 2016. doi:10.1002/we.1993.

P.M.O. Gebraad, F.W. Teeuwisse, J.W. van Wingerden, P.A. Fleming, S.D. Ruben, J.R. Marden, and L.Y. Pao. "Wind blant power optimization through yaw control using a parametric model for wake effects—a CFD simulation study" Wind Energy; Wind Energ. 2016; 19:95-114 Published online Dec. 22, 2014 in Wiley Online Library (wileyonlinelibrary.com). DOI: 10.1002/we.1822.

International Search Report and Written Opinion of the International Searching Authority dated Jun. 4, 2019 for Application No. PCT/EP2019/055120.

European Search Report and Written Opinion of the European Searching Authority dated Sep. 6, 2018 for Application No. 18160750.8.

* cited by examiner

DETERMINING CONTROL SETTINGS FOR A WIND TURBINE

This application claims priority to PCT Application No. PCT/EP2019/055120, having a filing date of Mar. 1, 2019, which is based off of EP Application No. 18160750.8, having a filing date of Mar. 8, 2018, the entire contents both of which are hereby incorporated by reference.

FIELD OF TECHNOLOGY

The following relates to a method and to an arrangement of determining a control setting of at least one wind turbine of a wind park, wherein in particular wake interactions are taken into account. Further, the following relates to a wind park comprising the arrangement for determining the control setting.

BACKGROUND

A wind park may comprise plural wind turbines which extract energy from the wind and convert the energy to electric energy. Due to the extraction of the energy by the rotating rotor blades, the wind stream is affected and modified downstream a considered wind turbine. In particular, downstream of an operating wind turbine there is a wake region generated due to the interaction with the rotor blades of the upstream wind turbine in which the wind speed is reduced and in which in general the wind condition is altered compared to a wind condition upstream the considered wind turbine. In general, downstream wind turbines may be subjected to lower wind speed than the upstream wind turbines.

In order to reduce production losses on downstream wind turbines caused by wakes of upstream turbines, optimized control settings have been conventionally considered. Optimized control settings have been based on the wind conditions coming into the wind farm which is also referred to as free-stream inflow or free-stream wind condition. Conventionally, the optimized control settings may have been designed to result in an increase of the wind speed in the wake region and/or in a deflection of a wake away from downstream turbines.

A conventional way to optimize flow in a wind park is to adjust the blade pitch or rotor speed control settings of the upstream wind turbines to increase the flow speed in the wake of the turbine. Further, EP 1 534 951 A1 discloses an assembly of energy flow collectors by which energy can be extracted from a flowing fluid. Thereby, devices on the upstream side of the assembly are set such that they exert lateral (horizontal and/or vertical) forces on the fluid flow, as a result of which flows are produced that guide fast fluid through the energy extracting devices and guide slow fluid precisely away from these. Thereby, a wake deflection using different yawing angles of different wind turbines may be set for optimizing overall power production. In the relevant art, a wind direction measurement has been utilized to schedule yawing, blade pitch or rotor speed control settings of wind turbines in a wind farm. Thereby, the control settings of the different wind turbines in the wind park has been set to different values such that for example wind park power output is maximized. Furthermore, conventionally, free-stream wind direction and free-stream wind speed have been considered for scheduling or setting optimized control settings of wind turbines in a wind park.

It has however been observed that the conventional methods for determining control settings of wind turbines in a wind park do not in all conditions lead to optimized or desired performance of the wind park, in particular regarding power output and/or load, in particular fatigue load.

Thus, there may be a need for a method and an arrangement of determining control settings of at least one wind turbine of a wind park, wherein a performance goal may be achieved in a reliable manner, in particular appropriately taking into account wake interactions between different wind turbines, in order to in particular optimize wind farm power output and/or to keep the load of the wind turbines of the wind park in acceptable limits.

SUMMARY

According to an embodiment of the present invention it is provided a method of determining a control setting of at least one wind turbine of a wind park, the method comprising determining a free-stream wind turbulence and deriving the control setting based on the free-stream wind turbulence. The control setting includes a yawing offset, wherein the yawing offset is derived to be the smaller, the higher the free-stream wind turbulence is. The latter can be expressed also differently, such that the higher the free-stream wind turbulence is, the smaller the yawing offset is.

The method may be performed by individual wind turbine controllers and/or by a wind park controller, such as a park pilot. The control setting may in particular be characterized by a setting of one or more values of one or more operational parameters of the wind turbine, in particular operational parameters which may affect a wake behind the considered wind turbine. The operational parameters may comprise any parameter which may affect wind flow and/or affect power production and/or which may affect a wake characteristic or wake interaction with other wind turbine(s).

The control setting of the at least one wind turbine or all control settings of all wind turbines may in particular be set such that a performance goal is achieved, for example optimizing or maximizing power output and/or keeping the load the individual wind turbines are subjected to within acceptable limits. The control setting may in particular comprise setting values of a yawing angle, setting values of at least one blade pitch angle, a value for a rotational speed of a rotor at which rotor blades are connected, a tilt angle of a rotor, etc.

The free-stream wind is considered to comprise the wind which comes into the wind turbine but which is not affected (e.g. not altered) by any other wind turbine, in particular not affected by any wind turbine rotor forces. Free-stream wind may be understood as a wind which is not affected by any wake of any upstream turbines. Thus, the free-stream wind may be considered to be the wind (for example characterized by wind speed, wind direction and/or wind turbulence) which would impact on a considered wind turbine when no other wind turbine (upstream therefrom for example) affects or modifies or alters the wind characteristics. The free-stream wind turbulence may be considered as a turbulence of the free-stream wind, thus as the turbulence of the wind impacting on the considered wind turbine unaltered by any other wind turbine potentially upstream of the considered wind turbine.

Considering the free-stream wind speed and free-stream wind direction has conventionally been utilized in a conventional wake model for modelling and optimization of operational behaviour of all wind turbines of the wind park. Conventionally, however, measured free-stream wind turbulence has not been taken into account. Embodiments of the present invention take into account free-stream wind direction, free-stream wind speed and free-stream wind turbulence for determining the control setting.

Free-stream wind (speed, direction and/or turbulence) may for example be measured and/or determined (e.g. involving computation) from operational parameters of a front turbine in a wind farm, i.e. a turbine which faces the wind unaffected by other wind turbines, e.g. without being any other wind turbines upstream therefrom. The free-stream wind turbulence may be (for example indirectly) measured or may be based on a measured quantity and/or may be based on computations for example at least taking into account operational characteristics of the considered wind turbine or one or more other wind turbines of the wind park. The free-stream wind turbulence may be based on a variance of the free-stream wind speed, for example. The free-stream wind turbulence may also take into account a variance or a change of the free-stream wind direction and/or free-stream wind speed.

Deriving the control setting (or all control settings of all wind turbines of the wind park) may involve computations, in particular applying a physical/mathematical model modelling or simulating all wind turbines of the wind park including wake interactions between different wind turbines. The control setting may include a definition of values of one or more operational parameters of the considered wind turbine.

According to an embodiment of the present invention, the at least one wind turbine may further be also controlled using the control settings.

The turbulence of the inflow (i.e. the free-stream wind turbulence) may be relevant, because it may determine to which extent the wake (downstream a particular wind turbine) will mix with the surrounding flow and recover to the free-stream wind conditions. The free-stream wind turbulence may be a complex phenomenon that in general may be hard to characterize. For simplification therefore, the wind inflow turbulence may be approximated or taken to be the variance of the free-stream wind speed.

The wake region may be a region downstream a considered wind turbine in which region the wind flow may be affected by rotor forces or may be affected by the operation of the upstream wind turbine.

The control setting may in particular relate to wake-influencing control settings, i.e. settings of the wind turbine which may affect or change the characteristics of the wind flow within the wake region or which may influence the geometry and/or size and/or shape of the wake region downstream the considered wind turbine. Wake-influencing turbine control signals may for example comprise any control degree of freedom on a wind turbine that may influence the wake of the wind turbine. Wake-influencing turbine control signals may for example comprise (1) rotor yaw angle, to redirect the wake flow direction, (2) blade pitch angle and/or rotor speed, to change the turbine thrust and thereby the wake flow velocity, (3) rotor tilt (a tilt angle measured between a horizontal direction and the rotor axis or rotational axis, thus defining a deviation of the rotor axis from a horizontal direction). In particular, the rotor tilt may be applied to deflect the wake flow direction upwards or downwards. Further, the wake-influencing control signals may include any combination of the above examples.

Determining or deriving the control setting may involve an offline model-based optimization. In particular, a set of optimized control settings may be pre-generated for each wind condition using a model that describes a system behaviour in each (free-stream wind) condition, before live operation with these optimized settings is performed. The model may be used to test different control settings and predict system behaviour. For example, through iteration and other type of optimization algorithms, the optimized settings giving the optimized system behaviour (for example giving optimized power output) may be found. The optimized settings for each condition may be stored in a table or in any other data structure in an electronic storage for example. In a live operation, the data structure having the pre-generated set of optimized control settings associated with different wind conditions may be looked up for that control setting being associated with the current wind condition. Possibly an interpolation between settings or conditions stored in the table may be performed to derive the control settings for the current (wind) condition.

Embodiments of the present invention may optimally schedule the wake-influencing control signal in order to improve wind farm performance (for example increased or optimized or maximized power production and/or reduced wake-induce dynamic turbine load causing wear and tear and thus maintenance) by controlling the interaction between upstream and downstream wind turbines through the wakes. The optimal schedule may be determined with a parametric wake model that describes or takes into account the interaction of different wind turbines. Different wake-influencing turbine control settings may be tested and optimized.

The wake model may be adapted (for example using one or more model parameters) to the current wind condition. For the adaptation of the wake model (in particular defining model parameters), a characterization of the inflow (i.e. the free-stream wind) may be needed. In particular, the turbulence of the free-stream wind may be taken into account in addition to the free-stream wind speed and/or free-stream wind direction, because it may determine how quickly the wake recovers as it flows away from the turbine downstream of the rotor. In particular, more inflow/ambient turbulence may increase the mixing of the wake with the surrounding free-stream flow and therefore the flow speed in the wake may recover more quickly (and/or closer to the wake causing wind turbine) compared to a situation having less free-stream wind turbulence.

According to an embodiment of the present invention, the free-stream wind turbulence is determined based on a, in particular low-pass filtered, variance of a free-stream wind speed. The free-stream wind speed may conventionally be measured or may be available. The variance may be calculated as a square root of a mean of a squared deviation between the free-stream wind speed and an averaged free-stream wind speed, for example. Thereby, the free-stream wind turbulence may be derived in a simple manner. The low-pass filtering may reduce or even eliminate noise, thereby improving the method. The free-stream wind turbulence may be at least an estimate of the effective inflow turbulence intensity. In particular, the free-stream wind turbulence may be generated by scaling the variance of the effective wind speed signal around its low-path filtered value.

According to an embodiment of the present invention the wind turbulence is estimated by use of the mean over a certain time period and the standard deviation of the estimated free-stream wind speed. E.g. the estimated turbine intensity is calculated as:

$$\text{TurbEst} = ((\text{Par1} \cdot \sigma)/\text{MeanWindSpeed}) + \text{Par2}$$

where $\sigma$ is the standard deviation of the free-stream wind speed, defined as the square root of the variance, and Par1 and Par2 are two tuning parameters; MeanWindSpeed is the mean of the free-stream wind speed.

According to an embodiment of the present invention, the free-stream wind speed is determined based on an operational condition and/or a wind measurement of at least one front wind turbine facing the wind essentially not disturbed by any other wind turbine, in particular using a 3D data table.

Measuring the free-stream wind speed may be difficult directly to be performed at the wind turbine, because the measurements at the wind turbine may be affected by the rotor operation. Thus, it may be advantageous to derive the free-stream wind speed based on operational condition of the wind turbine.

An estimate of the effective wind speed in the inflow (i.e. the free-stream wind speed) may be based on a turbine-specific three-dimensional rotor aerodynamic data table (or any other data structure) with electric power and thrust entries as a function of blade pitch angle and/or rotor rotational speed and/or inflow wind speed. For example, the current power level (for example power production) and blade pitch angle and rotor speed may be used to derive the effective wind speed (i.e. free-stream wind speed) from the table or data structure.

By using the turbine operational condition as a sensor rather than a local anemometer wind speed measurement, the wind speed determination may be less sensitive to small-scale turbulence and flow blockage effects of parts of the wind turbine. In particular, the thereby obtained effective wind speed may be low-path filtered with a large filter time constant (for example 600 s). In other embodiments, the free-stream wind speed may be measured by an upstream or front wind turbine. Furthermore, values for the free-stream wind speed derived by several front wind turbines may be combined, for example averaged.

According to an embodiment of the present invention, the operational condition comprises: current power level; and/or current blade pitch angle of at least one rotor blade; and/or rotational speed of a rotor of the front wind turbine. Thereby, for example, conventionally available equations or models may be utilized to derive the free-stream wind speed. The current power level may relate or may be equal to the current power production or the current power output of the wind turbine.

The scheduling of the (e.g. wake-influencing) control signals on each of the wind turbines may be based on the values of measurement (or computations) at a front turbine in the wind farm that is not affected by wakes of other turbines. A wake model may have been developed that predicts the power production of each turbine in the wind farm as a function of the free-stream wind speed and the free-stream wind direction and the wake-influencing turbine control signals or general control settings of each wind turbine.

According to an embodiment of the present invention, the control setting is further derived based on the free-stream wind speed and/or, in particular measured, free-stream wind direction. The wind speed (of the free-stream wind) may be relevant because it may determine the production operating point of the upstream wind turbine and thereby may also affect the amount of wake loss on the downstream wind turbine(s).

The free-stream wind direction may be relevant, because it may determine the direction (and/or geometry and/or size) of the wakes (and thus whether or not a wind turbine is within a wake region of any upstream wind turbine or not).

Thus, the wind direction may determine which of the wind turbines of the wind park are affected by a wake region of any upstream turbine.

The free-stream wind direction may be determined using or performing a measurement of the wind direction at the nacelle. In particular, a measurement value of the wind direction may be low-pass filtered with a low-filter time constant (for example 600 s).

According to an embodiment of the present invention, the control setting is derived, in particular such that wind park performance is optimized, using a wake model that predicts power production and/or loading of at least one, in particular all, wind turbines of the wind park based on, in particular thereby defining values of wake parameters: the free-stream wind speed, and/or the free-stream wind direction, and/or the control setting for at least one, in particular all, wind turbines, and/or the free-stream wind turbulence.

An algorithm to schedule or determine yaw offset and/or other wake-influencing control signals based on the combination of a free-stream wind direction, a free-stream wind speed and a free-stream wind turbulence characterization has not been published before and it has not been specified how these wind conditions should be measured.

Wake parameters of the models may be adapted to the (derived, for example indirectly measured) free-stream wind turbulence. This may be done in a discretized manner: For different ranges of the free-stream wind turbulence (for example bins), different wake parameters may be defined and used to have a better prediction of the turbine data (for example wind speed and power production at downstream turbines). In particular, the model parameters may be related to how quickly (and/or how far away from) the wake recovers behind the wind turbines, so that with high turbulence, the wake velocity may recover more quickly to the ambient free-stream velocity. In case the free-stream wind turbulence intensity is higher, this may result also in a higher wind speed and power production level predicted at a downstream wind turbine standing in the wake of an upstream wind turbine.

The wake model, with the different parameters settings for each free-stream wind turbulence range (for example bin) may be used to pre-generate a set of look-up tables of optimized wake control settings for each wind turbine and discretized combination of free-stream wind speed and free-stream wind direction (for example one table for each range of free-stream wind turbulence). Because the binning and the wake model adaption by turbulence intensity may result in a better model prediction of the interaction of the turbines through their wakes, the resulting optimized control settings for each wind condition may give a higher performance (or better performance in terms power production and/or fatigue load) of the wind farm compared to if the model is only adapted according to free-stream wind speed and free-stream wind direction as has conventionally be performed.

According to an embodiment of the present invention, the wake model predicts higher power production for a downstream wind turbine for higher free-stream wind turbulence (e.g. otherwise not changed wind characteristic). If there is higher free-stream wind turbulence, the flow downstream of a wind turbine may closer to the upstream wind turbine recover to the undisturbed wind flow thus resulting in a higher wind speed to impact on a downstream wind turbine to be predicted compared to conventional models. Taking into account this higher power production for a downstream wind turbine when relatively high turbulence is present, may allow improvement of an optimization regarding power production of the whole wind farm.

According to an embodiment of the present invention, a blade pitch offset (of an upstream wind turbine) is derived to be the smaller, the higher the free-stream wind turbulence is. In other words, the higher the free-stream wind turbulence, the smaller the blade pitch offset. A blade pitch offset (angle) may conventionally be applied to increase the wind speed at downstream wind turbine(s) by at least partly deflecting away the wake (region) from one or more downstream wind turbines. However, when the free-stream wind turbulence is relatively high, a relative smaller blade pitch offset (of an upstream wind turbine) may be sufficient to sufficiently or appropriately increase the wind speed (downstream the upstream wind turbine) at downstream wind turbine(s) due to faster recovery of the free-stream flow downstream the upstream wind turbine.

According to another embodiment of the present invention, a yawing offset is derived to be the smaller the higher the free-stream wind turbulence is. I.e. the higher the free-stream wind turbulence, the smaller the yawing offset.

In particular, a yawing offset may be considered to be an angle between the free-stream wind direction and the rotor axis of the wind turbine to be controlled. A yawing offset (angle) may conventionally be applied to deflect the wake (region) at least partly away from one or more downstream wind turbines. However, when the free-stream wind turbulence is relatively high, a relative smaller yawing offset may be sufficient to sufficiently or appropriately deflect the wake due to faster recovery of the free-stream flow downstream the wind turbine which is set regarding the yawing offset.

According to an embodiment of the present invention, the control setting include at least one wake-influencing wind turbine setting, in particular at least one of: a rotor yawing angle; and/or a pitch angle; and/or a rotor speed; and/or a rotor tilt; and/or a power production set-point. Furthermore, the control setting may include control signals to a converter of the wind turbine which may control rotational speed of the rotor and/or outputs of active power and/or reactive power and/or torque at the generator.

According to an embodiment of the present invention, the control setting is looked up from a multidimensional table or from one table of a set of tables each being associated with a particular free-stream wind turbulence range. Any other suitable data structure, such as a relational database and/or object-oriented database or any other data structure may be utilized for storing an association between characteristics of the free-stream wind and particular control settings.

According to an embodiment of the present invention it is provided a method of controlling a wind park, the method comprising: performing a method according to one of the preceding embodiments to derive control setting for at least one wind turbine of the wind park; limiting values of the control setting to comply with a rating of the control setting for the wind turbine; and controlling the wind turbine by the limited values of the control setting.

Thereby, in particular all wind turbines of the wind park may be controlled, allowing the wind park to operate in an optimized manner, satisfying at least one performance goal.

During the operation of the wind farm, the wind farm controller may select the relevant control settings look-up table (individually) for each wind turbine based on the value of the free-stream wind turbulence (and/or speed and/or direction) and may then interpolate (if necessary) the table based on the measured wind direction and wind speed to find the optimized wake control setting for each wind turbine in the wind farm.

The optimized control settings may ensure best performance of the complete wind farm, in terms of production and/or turbine loadings, as predicted by the model for the current inflow conditions (for example involving wind speed, direction and turbulence). These optimized control settings may be post-processed in a way that may ensure safe operation of each individual wind turbine (for example limiting the value of the and limiting the rate-of-change of the control setting command based on turbine operating state at that moment and/or based on rating of components of the wind turbine). The limited values may be supplied as control signals to the wind turbines.

It should be understood that features, individually or in any combination, disclosed, described or explained in the context of a method of determining a control setting of at least one wind turbine of a wind park may also be applied, individually or in any combination, to an arrangement for determining a control setting of at least one wind turbine of a wind park according to an embodiment of the present invention and vice versa.

According to an embodiment of the present invention it is provided an arrangement for determining a control setting of at least one wind turbine of a wind park, the arrangement comprising a processor adapted to: determine a free-stream wind turbulence; and derive the control setting based on the free-stream wind turbulence. The arrangement may be adapted to carry out or control a method of determining a control setting of at least one wind turbine of a wind park.

Furthermore, it is provided a wind park, comprising: plural wind turbines; and an arrangement according to the preceding embodiment, communicatively connected to the wind turbines to supply the respective control setting to each wind turbine.

A yawing offset of a considered wind turbine may be an angle between a free-stream wind direction and a direction of the rotation axis of the considered wind turbine. The yawing angle may be determined to be the greater, the smaller the turbulence (of the free-stream wind) is. That means, the smaller the turbulence, the greater or the larger the yawing angle. The yawing offset of a considered wind turbine may be determined such that the deflection of a wake region downstream of and caused by the upstream wind turbine is the greater, the smaller the free-stream wind turbulence is. That means, the smaller the free-stream wind turbulence, the greater or larger the deflection of the wake region. Further a blade pitch angle may be determined to be the greater, the smaller the turbulence (of the free-stream wind) is—i.e. the smaller the turbulence, the greater or larger the blade pitch angle—, such that a higher wind speed is retained in the wake that recovers more slowly to the free-stream conditions in smaller turbulence.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
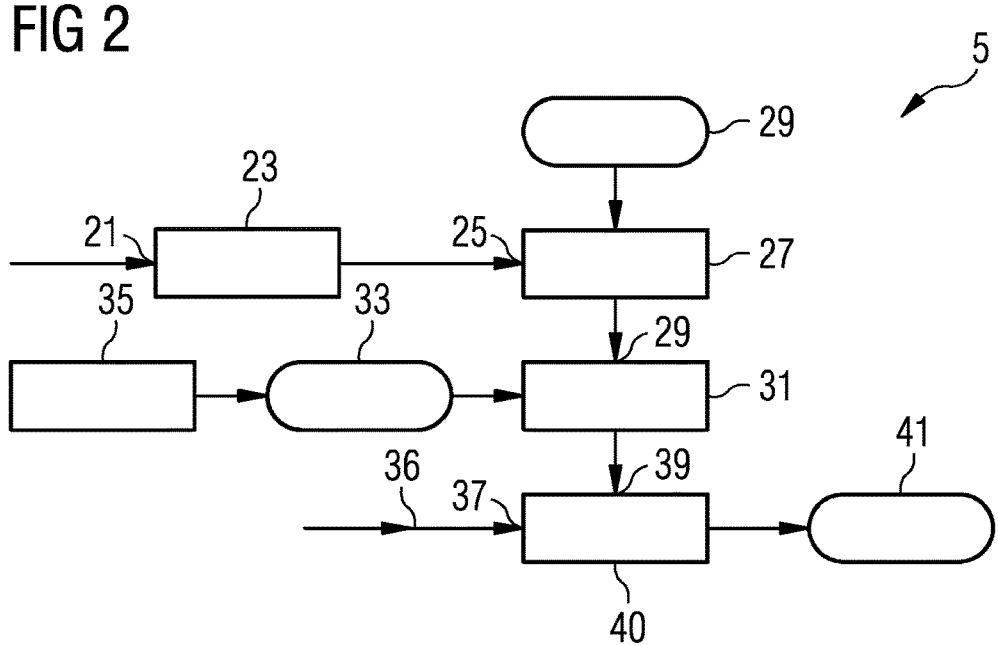
Figure 3:
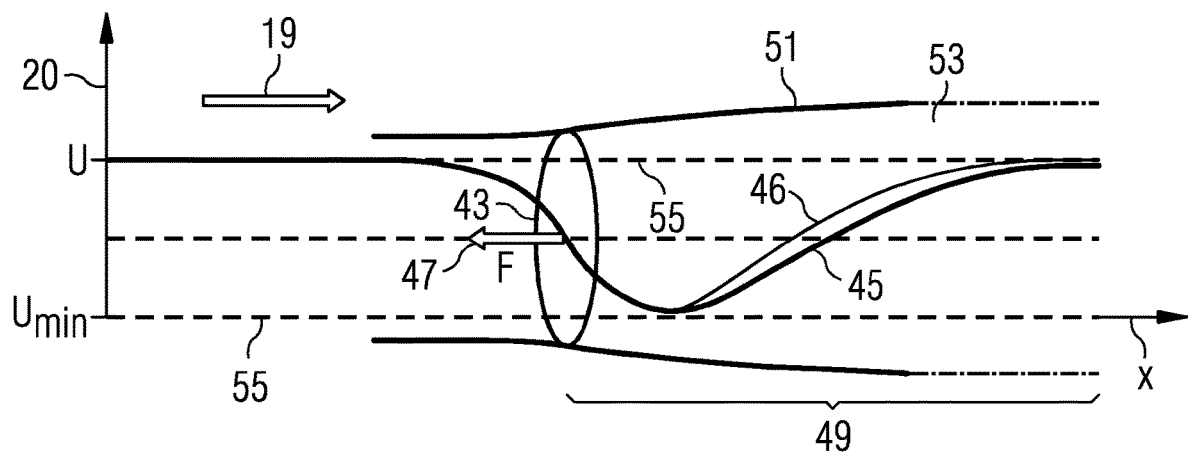

Some of the embodiments will be described in detail, with reference to the following figures, wherein like designations denote like members, wherein:

FIG. 1 schematically illustrates a wind park according to an embodiment of the present invention;

FIG. 2 schematically illustrates an arrangement for determining a control setting of at least one wind turbine according to an embodiment of the present invention which may be comprised in the wind park illustrated in FIG. 1; and FIG. 3 schematically illustrates wind flow characteristics upstream and downstream a wind turbine creating a wake.

DETAILED DESCRIPTION

The illustration in the drawings is in schematic form.

The wind park 1 schematically illustrated in FIG. 1 comprises plural wind turbines 3a,3b,3c and an arrangement 5 for determining a control setting of at least one wind turbine of the wind park 1 according to an embodiment of the present invention. Each wind turbine 3a,3b,3c comprises a respective wind turbine tower 7a,7b,7c having mounted on top a respective nacelle 9a,9b,9c which harbours an electric generator having a rotation shaft coupled with a hub 11a, 11b,11c. At the hub 11a,11b,11c plural respective rotor blades 13a,13b,13c are connected which drive the generator for producing electric energy. The wind turbines 3a,3b,3c may further each comprise a converter, in particular AC-DC-AC converter for converting a variable frequency power stream output by the electric generator to a fixed frequency power stream having for example a frequency of 50 Hz or 60 Hz. Each wind turbine may further comprise a wind turbine transformer for transforming an output voltage to a higher medium voltage.

The wind park may comprise more than three wind turbines, for example 20 to 100 wind turbines or even more wind turbines. The wind turbine power output terminals may commonly be connected at a point of common coupling which may supply electric energy (optionally via a wind park transformer) to a not illustrated utility grid. Each wind turbine 3a,3b,3c may comprise a wind turbine controller.

The arrangement 5 for determining control settings of at least one wind turbine 3a,3b,3c receives measurement signals and/or operational parameters 15a,15b,15c from the respective wind turbines 3a, 3b and 3c and supplies control signals 17a, 17b, 17c to the respective wind turbines 3a, 3b, 3c for controlling the operation of the wind turbines. In particular, the control signals 17a, 17b, 17c comprise or encode one or more control settings for one or more components of the wind turbines, such as regarding setting a rotor yawing angle, setting a power production set-point, setting a blade pitch angle, setting a rotational speed of the rotor and/or setting a rotor tilt.

The arrangement 5 derives the respective control settings (supplied via control signals 17a, 17b, 17c) based at least on a free-stream wind turbulence for which the arrangement 5 carries out a method of determining a control setting of at least one wind turbine 3a,3b,3c of a wind park 1 according to an embodiment of the present invention. Therefore, the arrangement 5 determines the free-stream wind turbulence for example based on a variance of a free-stream wind speed. The free-stream wind speed may for example be determined based on an operational condition and/or a wind measurement of at least one front wind turbine, such as wind turbine 3a which is facing the wind indicated with reference sign 19 (e.g. having a particular free-stream wind speed, direction and turbulence).

The operational condition and/or the wind measurement of the front turbine 3a may for example be supplied via the signal 15a to the arrangement 5. The operational condition may in particular comprise the current power level, current blade pitch angle and current rotational speed of the rotor of the front turbine 3a. Based on these values, the arrangement 5 may then (using one or more tables or relationships or program modules, for example) derive the free-stream wind speed for plural successive time points or time intervals. The arrangement 5 may then calculate the variance of the free-stream wind speed to obtain the (estimation of) the free-stream wind turbulence.

The arrangement 5 further provides an implementation of a wake model having model parameters which may be defined based on for example a measured free-stream wind direction, the free-stream wind speed and the free-stream wind turbulence. The wake model may be utilized for deriving the wind turbine control signals 17a, 17b, 17c (individually for the corresponding wind turbine) to derive and supply the wind turbine control signals 17a, 17b, 17c, such as to satisfy a performance goal, such as optimizing power production of the entire wind park 1.

FIG. 2 schematically illustrates an embodiment of the arrangement 5 as an example implementation. As an input, the arrangement 5 comprises a free-stream wind speed 21 which may for example be based on the operational condition of an upstream wind turbine, such as upstream wind turbine 3a illustrated in FIG. 1. The arrangement 5 comprises a variance determination module 23 which determines the variance of the free-stream wind speed 21 and performs a scaling, to output a free-stream turbulence intensity 25 which is supplied to a turbulence binning module 27. A turbulence bin range definition module 29 supplies turbulent bin ranges to the turbulence binning module 27 which outputs turbulent bin indices 29 which are supplied to a table selection module 31. Within an electronic storage, the arrangement 5 comprises control settings look-up tables (or other data structures) 33 associating control settings with particular free-stream wind conditions. The control settings look-up tables 33 may have been determined using a wake algorithm or determination model 35 which may perform a wake model-based optimization for each wind condition (in particular offline). The table selection module 31 selects from the plural control settings look-up tables 33 the table corresponding to the current free-stream turbulence intensity 25 and provides therefrom the respective control settings (in particular for each wind turbine 3a, 3b, 3c of the wind farm 1). The output of the table selection module 31 may be a look-up table with the optimized control settings for each wind direction and wind speed of the free-stream wind.

The arrangement 5 further receives as input the free-stream wind direction 36 and free-stream wind speed 37 for example measured or determined from a front turbine 3a. The optimized control setting may either be taken from the look-up table 39 output by the table selection model 31 or may be interpolated (using interpolation module 40) between two or more tables providing control settings close to the current free-stream wind direction and speed 37. Finally, the arrangement 5 outputs the optimized wind turbine control settings 41 which may then be supplied, via the control signals 17a, 17b, 17c individually to all wind turbines 3a, 3b, 3c.

FIG. 3 schematically illustrates wind flow upstream and downstream a wind turbine having rotor blades rotating in a rotor disk 43. Upstream the rotor disk 43, the wind 19 has a free-stream wind velocity U which then varies in dependence of a lateral position x according to a first curve 45 for a first turbulence and according to a second curve 46 for a second turbulence in a coordinate system having as ordinate 20 wind speed and having as abscissa lateral extent x.

The rotor disk 43 including the rotating rotor blades exerts a force 47 on the wind 19 resulting in a decrease of the wind velocity 45 downstream the rotor disk 43. The wind velocity 45, 46 reaches downstream the rotor disk 43 a minimum $U_{min}$ and increases then within a wake region 49 substantially towards the upstream wind velocity U. The region 51 defines a shape of the wake 49. Within a mixing region 53, radially outwards of a rotor stream tube 55, mixing of the free-stream wind with the wind affected by the rotor disk 43 occurs.

The shape of the wind velocity 45, 46 downstream a wind turbine is different for different free-stream wind turbulence of the wind 19. In particular, the wind velocity (second curve 46) may be recovered to the upstream value U for a higher (second) free-stream wind turbulence closer to the rotor disk 43 than for a lower (first) turbulence (first curve 45). The wind velocity for the higher second turbulence is indicated with reference sign 46. The wind velocity for the lower second turbulence is indicated with reference sign 45. Thus, taking into account the free-stream wind turbulence may enable to derive optimized control settings for all wind turbines of the wind farm.

In particular, embodiments of the present invention may allow a better prediction of the optimized wind turbine control settings resulting in an improved mitigation of wake losses in wind farms and thereby a higher electrical energy production of the wind farm may be achieved. Adaptation to estimated turbulence intensity may result in a more accurate prediction of the optimized control settings. The use of filtered wind speed and direction signals may make the optimized control settings less sensitive to measurement errors and may thus also result in a better prediction of the optimized control settings. The wake optimization methodology may be retrofitted to existing wind farms in order to improve their operation.

Alternatively, to having for each turbulence bin an associated data table with control settings, a full parameterized model may be defined with free-stream turbulence, free-stream wind speed and free-stream wind direction as an input. Thus, a single 3D look-up table may be predefined for the optimized control settings of each wind turbine with the three aforementioned input parameters as selection.

Rather than using a pre-calculated offline model, the model and look-up table could also be adaptive using a learning controller (for example model and control settings look-up table updated online using online parameter fitting based on measurements and online optimization).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a control setting of at least one wind turbine of a wind park, the method comprising:
   determining a free-stream wind turbulence; and
   deriving the control setting based on the free-stream wind turbulence,
   wherein the control setting includes a yawing offset, wherein the yawing offset is derived to decrease as the free-stream wind turbulence increases.

2. The method according to claim 1, wherein the free-stream wind turbulence is determined based on a variance of a free-stream wind speed.

3. The method according to claim 2, wherein the free-stream wind speed is determined based on at least one of an operational condition and a wind measurement of at least one front wind turbine facing the wind essentially not disturbed by any other wind turbine.

4. The method according to claim 3, wherein the operational condition comprises at least one of a:
   current power level;
   current pitch angle of at least one rotor blade; and
   rotational speed of a rotor of the front wind turbine.

5. The method according to claim 1, wherein the control setting is further derived based on at least one of the free-stream wind speed and, measured, free-stream wind direction.

6. The method according to claim 1, wherein the control setting is derived such that wind park performance is optimized, using a wake model.

7. The method according to claim 6, wherein the wake model predicts power production and/or loading of at least one wind turbine of the wind park based on wake parameters including at least one of:
   the free-stream wind speed,
   the free-stream wind direction,
   the control setting for at least one, wind turbines, and
   the free-stream wind turbulence.

8. The method according to claim 6, wherein the wake model predicts higher power production for a downstream wind turbine for higher free-stream wind turbulence.

9. The method according to claim 1, wherein the control setting includes at least one wake-influencing wind turbine setting, wherein the at least one wake-influencing wind turbine setting includes at least one of:
   a rotor yawing angle;
   a pitch angle;
   a rotor speed;
   a power production set-point; and
   a rotor tilt.

10. The method according to claim 1, wherein the control setting is looked up from a multidimensional table or from one table of a set of tables each being associated with a particular free-stream wind turbulence range.

11. A method of controlling a wind park, the method comprising:
   performing the method according to claim 1 to derive control setting for at least one wind turbine of the wind park;
   limiting values of the control setting to comply with a rating of the control setting for the wind turbine; and
   controlling the wind turbine by the limited values of the control setting.

12. An arrangement for determining a control setting of at least one wind turbine of a wind park, the arrangement comprising a processor including hardware and adapted to:
   determine a free-stream wind turbulence; and
   derive the control setting based on the free-stream wind turbulence.

13. A wind park, comprising:
   plural wind turbines; and
   an arrangement for determining a control setting of at least one wind turbine of the plural wind turbines, the arrangement comprising a processor including hardware and adapted to determine a free-stream wind turbulence and derive the control setting based on the free-stream wind turbulence wherein the arrangement is communicatively connected to the plural wind turbines to supply a respective control setting to each wind turbine of the plural wind turbines;
  wherein the control setting includes a yawing offset,
    wherein the yawing offset is derived to decrease as the free-stream wind turbulence increases.

14. The method according to claim 1, wherein the free-stream wind turbulence is determined based on a low-pass filtered variance of a free-stream wind speed.

15. The method according to claim 2, wherein the free-stream wind speed is determined using a 3D data table.

16. The method according to claim 6, wherein the wake model predicts power production and/or loading of all wind turbines of the wind park.

17. The method according to claim 6, wherein the wake model predicts power production and/or loading of at least one wind turbine of the wind park thereby defining values of wake parameters including at least one of:
  the free-stream wind speed,
  the free-stream wind direction,
  the control setting for at least one, wind turbines, and
  the free-stream wind turbulence.

* * * * *